Jan. 16, 1951 C. W. BUCKHAM 2,538,666
CARRIER FOR PHOTOGRAPHIC SENSITIZED SHEET MATERIAL
Filed Dec. 19, 1947 2 Sheets-Sheet 1
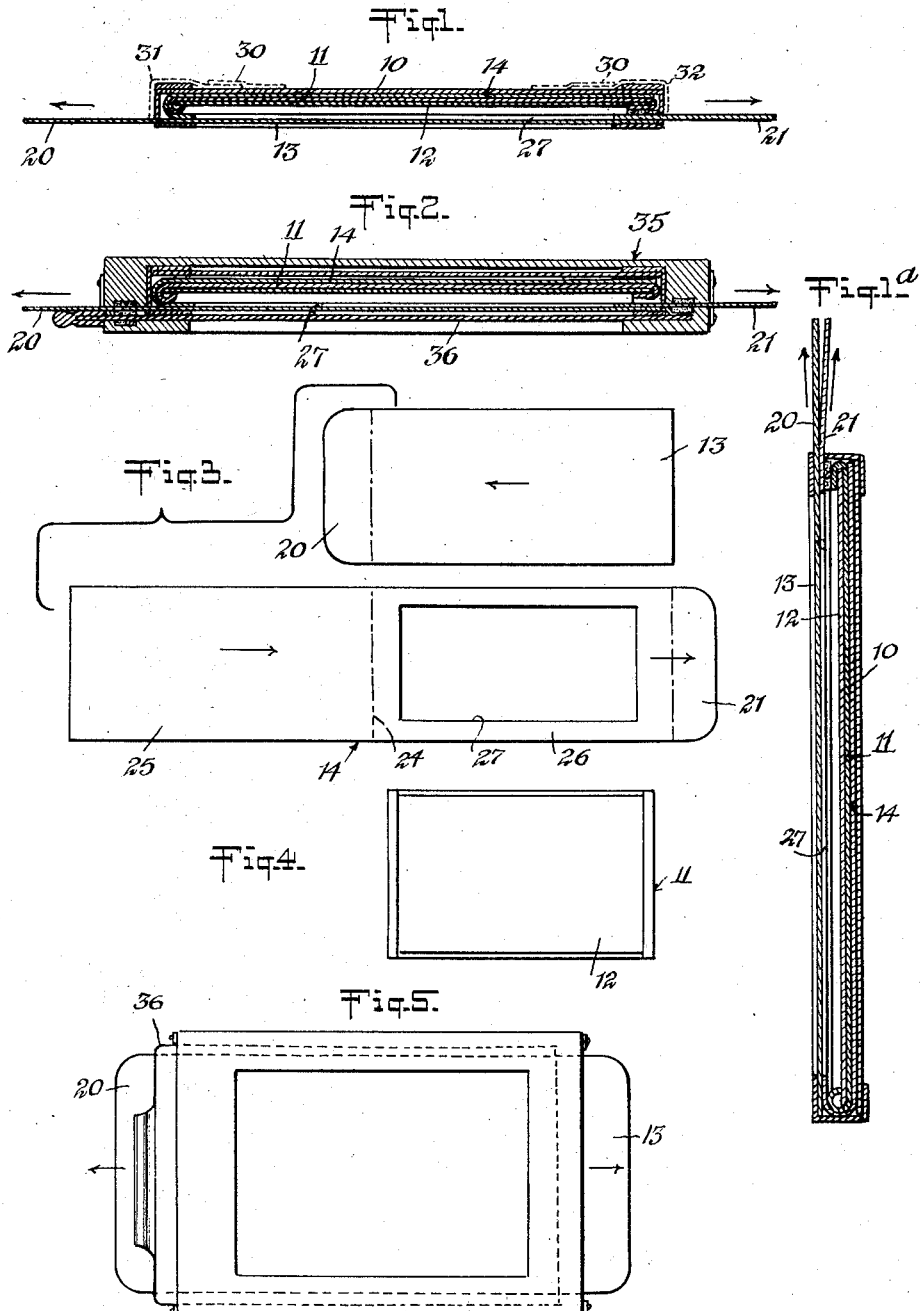
INVENTOR
Charles W. Buckham
BY
Munn, Liddy & Glaccum
ATTORNEYS Jan. 16, 1951  C. W. BUCKHAM  2,538,666
CARRIER FOR PHOTOGRAPHIC SENSITIZED SHEET MATERIAL
Filed Dec. 19, 1947  2 Sheets-Sheet 2
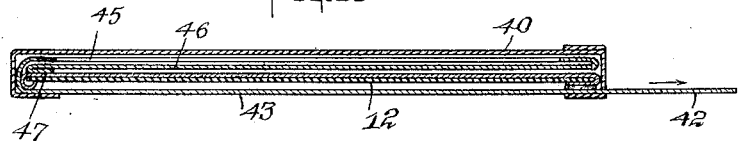
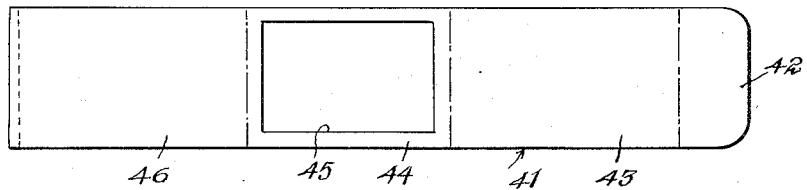
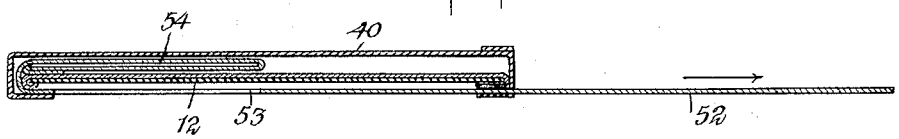
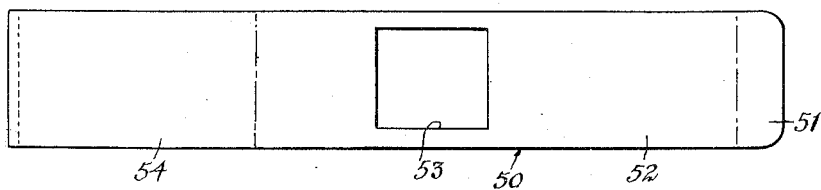
INVENTOR
Charles W. Buckham
BY
Munn, Liddy & Glaccum
ATTORNEYS Patented Jan. 16, 1951

2,538,666

UNITED STATES PATENT OFFICE 2,538,666

CARRIER FOR PHOTOGRAPHIC SENSITIZED SHEET MATERIAL

Charles W. Buckham, Scarsdale, N. Y.

Application December 19, 1947, Serial No. 792,671

5 Claims. (Cl. 95—72)

This invention relates to individual carriers of cut or sheet film, wherein each film unit is provided with its own individual carrier. One of the disadvantages in the use of cameras which utilize sheet or cut film is the fact that the film must be loaded into its film holder in a dark room, and it must likewise be removed therefrom in a dark room or changing bag to prevent exposure to light.

The present invention has as its principal object the provision of an individual carrier for sheet film which prevents exposure to light during the loading and unloading operations. Briefly, the object of this invention is the provision of a carrier for sheet film which encloses the film when it is purchased in the store and which continues to enclose the film when it is inserted into the film holder and when it is removed therefrom so that the film may be handled in the presence of light without danger of premature or otherwise untimely exposure. In other words, this device is a means which encloses sheet film at all times from the moment it is originally packed in the factory until it is exposed in the developing room during the developing process. Provision is made, however, for exposure through said means in the camera proper so that the photographic process may take place in the usual manner.

Briefly, the device herein claimed comprises an envelope which completely covers and conceals the sheet film. A part of the envelope may be removed to expose the film in the camera and another part of the envelope may thereafter be moved to replace the removed part to cover the exposed film. More particularly, the device herein claimed is an envelope which has a window through which the sheet film may be exposed. A screen is provided to cover or close the window before exposure and said screen may be removed to permit exposure. A second screen is also provided which is adapted to take the place of the first screen to cover the now exposed film. The two screens may be separate and independent entities or they may be part of the same integral structure.

Preferred embodiments of this invention are shown in the accompanying drawing in which—

Fig. 1 is a horizontal section through the first embodiment;

Fig. 1A is similar to Fig. 1 but showing the withdrawable tabs extending from the same side of the envelope;

Fig. 2 is a view similar to that of Fig. 1 showing the device in a film holder;

Fig. 3 is a plan view of the two screen members of the first embodiment including the window section which is connected to one of said screen members;

Fig. 4 is a plan view of the film supporter which forms part of the device shown in Fig. 1;

Fig. 5 is a plan or front view of the device shown in Fig. 2 including the holder shown therein;

Fig. 6 is a horizontal section similar to that of Fig. 1 of the second embodiment of this invention;

Fig. 7 is a plan view of the screen and window members of said embodiment;

Fig. 8 is a view similar to that of Fig. 6 showing a screen portion of the screen and window element removed from its screening position therein; and Fig. 9 is a plan view similar to that of Fig. 7 of another form of screen and window element which may be used with the embodiment of this invention shown in Fig. 6.

Referring now to the first five figures of the drawing, it will be noted that the device herein claimed consists principally of the following elements: A film envelope 10 encasing a film support 11 for the film 12, a removable screen 13, and a second screen member 14 which is also movable and which has a window 27 formed therein.

The film 12 is a conventional film of cut or sheet type, and it is held in place in film envelope 10 by means of film support 11. This film support comprises a rectangular sheet of stiff material such as thin fibre board or metal and its two side edges are curled inwardly to form a means of engaging and holding the film. The film envelope 10 is a box-like affair which is open at the front and closed on all of its other sides, to wit, its top, bottom, side and back walls. When the film support 11 carrying the film 12 is placed in the film envelope 10, the walls of said film envelope hold the film support in place. Although the front of said film envelope has been described as being open, it will be understood and noted in the drawing that it is only partly open, sufficiently so to provide for complete exposure of the film at the proper time. The envelope 10 is provided with marginal walls along its four sides so that the film support 11 may be held in place in said envelope. The envelope has been described as having top, bottom, and side walls. Actually, these walls need not be very sharply defined in the sense of having any substantial width. These top, bottom, and side walls may merely comprise edge portions by which the front and the back of the envelope are joined.

It will be seen in Fig. 1 that the sides of envelope 10 are provided with openings through which flaps 20 and 21 extend. Flap 20 can best be seen in Fig. 3 as being connected to the end of screen 13. Flap 21 is connected to screen 14 and this flap, too, may be joined to said screen. Screen 14 has another dividing line 24 marked or perforated therein which separates the screen portion 25 from the window portion 26. Window 27 is formed in portion 26, and it will be noted that on one side is the flap 21 and on the opposite side is the screen portion 25.

Fig. 1 shows how the above described members are assembled for use. Screen 13 is the first or front member in envelope 10. It extends across the entire envelope, and its flap 20 extends outwardly from said envelope through an opening in one side of said envelope. Screen 13 may be withdrawn from the envelope by simply pulling upon flap 20. The second element in envelope 10 is the screen and window element 14. The screen proper 25 of said element extends around one of the curled edges of film support 11 and occupies a position behind said film support. The windowed portion of screen 14, to wit, portion 26 extends in front of the film support 11, and its flap portion 21 projects outwardly from said film envelope 10 through an opening in the side of said envelope. When it is desired to expose film 12, flap 20 is pulled and screen 13 is removed from the film envelope 10. The film may now be exposed through window 27. Following exposure tab 21 may be pulled until the windowed portion 26 of member 14 is removed from the film envelope. Since this windowed portion is connected to the screen portion 25, said screen portion is thereby pulled in front of the exposed film 12, thereby covering said film and preventing further exposure thereof.

It will be noted in Fig. 1 that the outwardly projecting flaps 20 and 21 may, if desired, be folded backwardly and around the side edges of envelope 10 and that they may be held in place against the back of said envelope by means of gummed strips 30. This is simply to provide a neater package and to keep the flaps 20 and 21 out of the way until it is desired to use them in the manner above described. Dotted lines 31 and 32 indicate the positions which these two flaps would occupy if they were folded backwardly and against the back of envelope 10.

The entire unit above described may be inserted into film holder 35 which has a slide 36 connected thereto in the usual manner. This film holder also has side openings corresponding to the side openings in envelope 10 through which flaps 20 and 21 may extend.

A slightly modified form of this first embodiment is shown in Fig. 1A which is identical with Fig. 1, except that the tab 21 and its associated screen and window portions 25 and 26 are withdrawable from the envelope on the same side thereof as the tab 20. This will permit removal of both tabs in the same direction especially when the plate holder is disposed in a vertical position and the mounting of a camera on a tripod or similar support would make it very inconvenient to withdraw the tab 21 downwardly from the bottom thereof.

The second embodiment of this invention is shown in Figs. 6 and 7. Here envelope 40 corresponds to envelope 10. It has, however, only one opening in one of its sides rather than an opening in each of its two sides as is the case with envelope 10. The screen 41 corresponds to the two screen members 13 and 14. It has a flap 42 which extends through the side opening in envelope 40. Connected to flap 42 is screen 43 which corresponds to screen 13 and which conceals the film. The next section 44 has a window 45 formed therein which corresponds to window 27 of the first embodiment, and finally there is a second screen portion 46 which corresponds to the screen portion 25 of the first embodiment. Screen portion 46 is fastened at its end 47 to the film support 11 to prevent it from being totally withdrawn. Fig. 6 shows how this screen member 41 is folded upon itself in the envelope 40. To expose the film 12, flap 42 is pulled in the direction of the arrow in Fig. 6 until its windowed portion 44 registers with the film. After exposure the member 41 is again pulled in the direction of the arrow in Fig. 6 until its screen portion 46 covers the film. Portions 42, 43, and 44 may now be torn away from portion 46, because they are no longer needed.

In Figs. 8 and 9 is a third embodiment of this invention. The envelope 40 is still used in this embodiment and the sole important difference is in the screen unit 50. This screen unit 50 has a flap 51 corresponding to flap 42, a screen portion 52 corresponding to screen portion 43, a window 53 corresponding to window 45, and a second screen portion 54 corresponding to screen portion 46. It will be noted that window 53 occupies only a part of the space that window 45 occupies. For convenience sake, window 53 may be considered as occupying half the area of film 12. When window 53 registers with the film, therefore, it exposes only a half of it, and the screen unit 50 may be utilized to expose successive half portions of the film. This is done in the following way: Flap 51 is pulled in the direction of the arrow in Fig. 8 until window 53 exposes half of the film. Following exposure the flap is again pulled in the same direction until the exposed portion of the film is covered and the window exposes the second, unexposed half of the film. This second half of the film may now be exposed and following exposure it may be covered in the manner above indicated.

It should clearly be understood that window 53 may be formed in different dimensions and in different locations, and further it should be understood that more than one window may be formed in the same screen member 50. For example, the window may be made to expose only one third of the film at any one time and the film may, therefore, be exposed on three successive occasions in connection with three separate and independent exposures. When two windows are used instead of one, they should be so located that one is disposed above the other and also either to the right or to the left of the other. Where, for example, two windows are used and each extends across an area corresponding to one quarter of the film area, the film may be exposed on four separate occasions, each exposure being of a quarter of the film.

The invention herein above described may be modified in other ways than those above indicated within the broad framework of the principles thereof as herein set forth. The material used in making the screens and the film support and the envelope may vary in accordance with varying requirements.

I claim:

1. A device of the character described which comprises an envelope open at the front to expose a film therein, a film support within said envelope, an integral screen element having an end extending somewhat beyond the envelope to be grasped in the hand of the operator, a portion of said element disposed in front of the film and the remainder of said element passing around the support and normally lying behind the support back of the film thereon, the portion of the screen element normally disposed in front of the film having a window opening therein.

2. A device of the character described which comprises an envelope open at the front to expose a film therein, a film support within said envelope, an integral screen element having an end extending somewhat beyond the envelope to be grasped in the hand of the operator, a portion of said element disposed in front of the film and the remainder of said element passing around the support and normally lying behind the support back of the film thereon, a portion of said screen element lying back of the film having a window opening therein.

3. A device of the character described which comprises an envelope open at the front to expose a film therein, a film support within said envelope, said envelope having lateral openings, a screen element disposed in front of said film and having a portion projecting through a lateral opening to enable the operator to grasp the same and pull the screen element out from in front of the film, a second screen element also having a portion extending beyond a lateral opening to be grasped in the hand, said second screen element having a portion lying in front of the film and provided with a window in this portion, said second screen having an integral portion extending around the edge of the film support and extending behind the film support, said rear portion adapted to be pulled around in front of the film when the first portion thereof is pulled out of the lateral opening.

4. A device of the class described which comprises an envelope open at the front to expose a film therein, a film support within said envelope, said envelope, said envelope having a lateral opening, a screen element having a portion disposed in front of said film and with a portion extending through said lateral opening to enable the operator to grasp the same, said screen element having an integral second portion extending around back of the film support and provided with a window therein, said screen element having a third portion connected to the second portion and lying back of the film support, said second and third portions of the screen element adapted to be successively disposed in front of the film support as the operator pulls the screen out of the lateral opening.

5. A device of the character described which comprises an envelope open at the front to expose a film therein, a film support within said envelope, said envelope having lateral openings therein, a screen element disposed in front of said film and having a portion projecting through a lateral opening to enable the operator to grasp the same and pull the screen element out from in front of the film, a second screen element also having a portion extending beyond a lateral opening to be grasped by the hand, said second screen element having a second portion lying in front of the film and provided with a window in this portion, said second screen element having a third portion connected to the second portion and lying back of the film support, said second and third portions of the screen element adapted to be successively disposed in front of the film support as the operator pulls the screen out of the lateral opening.

CHARLES W. BUCKHAM.

REFERENCES CITED

The following references are of record in the file of this patent:

UNITED STATES PATENTS

| Number | Name | Date |
|---|---|---|
| 1,352,134 | Johnson | Sept. 7, 1920 |
| 1,423,420 | Hantsch | July 18, 1922 |
| 2,074,890 | Casler | Mar. 23, 1937 |
| 2,150,372 | Goddard | Mar. 14, 1939 |

FOREIGN PATENTS

| Number | Country | Date |
|---|---|---|
| 304,206 | Germany | June 23, 1919 |